US006339836B1

(12) United States Patent
Eisenhofer et al.

(10) Patent No.: US 6,339,836 B1
(45) Date of Patent: *Jan. 15, 2002

(54) AUTOMATED DESIGN PARTITIONING

(75) Inventors: Karl Eisenhofer, San Jose; Kevin Nazareth, Scotts Valley; Peter Odryna, Santa Cruz, all of CA (US)

(73) Assignee: Mentor Graphics Corporation, Wilsonville, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,156

(22) Filed: Aug. 24, 1998

(51) Int. Cl.$^7$ .............................................. G06F 17/50
(52) U.S. Cl. ......................................................... 716/5
(58) Field of Search .............................. 716/16, 7, 5, 6, 716/8, 9, 12

(56) References Cited

U.S. PATENT DOCUMENTS

| 5,668,732 A | 9/1997 | Khouja et al. ................. 702/60 |
| 5,838,947 A | 11/1998 | Sarin ............................ 703/14 |
| 5,896,300 A | 4/1999 | Raghavan et al. ............. 716/10 |
| 5,920,485 A | 7/1999 | Mangelsdorf ................. 703/16 |
| 6,002,861 A | * 12/1999 | Butts ............................ 716/16 |

OTHER PUBLICATIONS

Blacker, CUBIT Mesh Generation Enviornment: vol. 1 Users Manual, Sandia National Laboratories SAND94–1100.
Blacker, FASTQ Users Manual, Version 2.1, Sandia National Laboratories SAND88–1326.
Summers, et al., ALEGRA: An Advanced Framework for High Energy Density Solid Dynamics Simulations, Sandia National Laboratories SAND97–2636C.

(List continued on next page.)

*Primary Examiner*—Matthew Smith
*Assistant Examiner*—Thuan Do
(74) *Attorney, Agent, or Firm*—Blakely, Sokoloff, Taylor & Zafman, LLP (57) ABSTRACT

A flexible and extensible automated design partitioning mechanism that facilitates simulation sessions employing two or more simulators is provided. A simulation backplane includes partitioning logic that identifies the design blocks of an overall design pertaining to each of a plurality of simulators. Once the partitions have been identified, nets that cross simulator boundaries (e.g., mixed nets) are determined and inter-simulator connectivity information is generated for the simulators. According to one aspect of the present invention, the partitioning logic is able to accomodate arbitrary (e.g., instance-based) partitioning. A design source expressed in a design representation upon which a first simulator may operate is received. Design blocks to be partitioned to each of a plurality of solvers are identified based upon one or more partitioning directives and the design source. A first instance of a cell is assigned to a first solver and a second instance of the cell is assigned to a second solver. Netlist like information is generated for those of the design blocks that are partitioned to a non-design source solver. To accomodate a folded representation of a design block containing the first or second instance of the cell, one or more additional cells are created. According to another aspect of the present invention, name space mapping is retained across all simulators. A design source upon which a first simulator may operate is read. Based upon a set of rules, a primary partition that is to be simulated by a first solver is identified. The primary partition includes a top cell of the design representation. Additionally, a secondary partition that is to be simulated by a second solver is identified. Subsequently, netlist information is generated for the second solver while retaining name space mapping in the secondary partition by adding one or more levels of hierarchy so as to include information about the top cell in the secondary partition.

33 Claims, 7 Drawing Sheets

OTHER PUBLICATIONS

Benson., "An Efficient Accurate, Simple ALE Method for Nonlinear Finite Element Programs," in Computer Methods in Applied Mechanics and Engineering 72 (1989).

Benson., "Vectorization Techniques for Explicity Arbitrary Lagrangian–Eulerian Calculations," in Computer Methods in Applied Mechanics and Engineering.

* cited by examiner

AUTOMATED DESIGN PARTITIONING

NOTICE OF RELATED APPLICATIONS

A separate application includes subject matter that may be related to the present application herein. The potentially related pending application is entitled, "Optimizing Runtime Communication Processing Between Simulators", application ser. No. 09/135,215, filed on Aug. 25, 1998 and is incorporated herein by reference.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of electronic simulation tools and Electronic Design Automation (EDA). More particularly, the invention relates to co-/ multisimulation technology and automated design partitioning.

2. Description of the Related Art

A number of trends in the design verification market and technological factors are making it increasingly more desirable to be able to employ multiple simulation tools on the same design. For instance, simulation tools are becoming increasingly more specialized while the number of simulation products is steadily growing. Additionally, the simulation task is becoming more decentralized as designers of all types of electronic products are using simulation at every phase of the design process, from analyzing tradeoffs during early architectural analysis, through detailed design of digital and analog circuits to optimize performance and power dissipation, to verification of hardware and firmware for complete system emulation and test. Moreover, design complexity and design diversity are increasing and each design technology (e.g., IC design, board design, and system design) tends to have its own simulation tools, models and vendors. Therefore, a typical design process may incorporate multiple tools from multiple vendors.

Co-simulation, the verification of a design using two simulators concurrently in a simulation session is advantageous to designers in many ways. For example, by employing co-simulation techniques, a designer that is familiar with a particular simulator, such as Verilog-XL, may gain the benefits of additional simulation algorithms, such as Synopsys/EPIC's TimeMill and/or IKOS's NSIM, without leaving the Verilog environment. Additionally, in theory, designers gain the freedom to choose the best verification tools for each task during the design process.

However, co-simulation solutions thus far have several shortcomings. By way of example, simulator vendors typically offer "glued" or "merged kernel" products that are not based upon extensible technology. A typical prior glued approach involves the manual gluing together of two simulators through a Procedural Language Interface (PLI). Additionally, before co-simulation may begin, the designer must manually partition the design between the two simulators, e.g., by producing design source files usable by each simulator, and write special routines to facilitate the linkage and synchronization between the simulators. As a result, subsequent design modifications and/or partition changes to such a handstitched design results in numerous error prone manual steps to accomplish the necessary re-partitioning. Moreover, prior co-simulation solutions support only a simple all-or-nothing distribution of design objects (e.g., cell-based partitioning) among simulators and are therefore typically incapable of handling arbitrary partitions. Finally, prior co-simulation solutions do not preserve name space mapping across partitions. Consequently, during simulation, the user is required to perform manual signal name translations.

In light of the foregoing, what is needed is a simulation solution which provides an intelligent automated design partitioning mechanism.

BRIEF SUMMARY OF THE INVENTION

A flexible and extensible automated design partitioning mechanism that facilitates simulation sessions employing two or more client simulators is described. According to one aspect of the present invention, the automated design partitioning mechanism is able to accomodate arbitrary (e.g., instance-based) partitioning. A design source expressed in a design representation upon which a first simulator may operate is received. Design blocks to be partitioned to each of a plurality of solvers are identified based upon one or more partitioning directives and the design source. A first instance of a cell is assigned to a first solver and a second instance of the cell is assigned to a second solver. Netlist like information is generated for those of the design blocks that are partitioned to a non-design source solver. To accomodate a folded representation of a design block containing the first or second instance of the cell, one or more additional cells are created.

According to another aspect of the present invention, name space mapping is retained across all simulators. A design source upon which a first simulator may operate is read. Based upon a set of rules, a primary partition that is to be simulated by a first solver is identified. The primary partition includes a top cell of the design representation. Additionally, a secondary partition that is to be simulated by a second solver is identified. Subsequently, netlist information is generated for the second solver while retaining name space mapping in the secondary partition by adding one or more levels of hierarchy so as to include information about the top cell in the secondary partition.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DESCRIPTION OF THE INVENTION

A flexible and extensible automated design partitioning mechanism that facilitates simulation sessions employing multiple simulators is described. According to various embodiments of the present invention, a multi-source hierarchical partitioning system provides a designer with the ability to create customized flows based upon combinations of schematics and hardware description languages (HDLs). Briefly, as one feature of the present invention, a designer may use simple rules to specify which of a plurality of simulators will simulate various parts of a design. In one embodiment, the automated design partitioning mechanism generates hierarchical design representations for all partitions, including those associated with non-design source simulators in order to preserve name space mapping across all simulators. Additionally, the automated design partitioning mechanism permits the user to specify arbitrary partitions thereby allowing various instances of a given cell to be simulated by different simulators.

Based upon the partitioning rules specified by the designer and the design source files, a technique called partitioning is employed to produce design information in the form of files, data structures and the like for simulation. The partitioning process can generate two different kinds of design information for simulation depending on the relationship between the simulator and the design source. If the design source is written in an external native design representation from which the simulator can extract the design, then the partitioner may re-use and edit those design source files that are applicable to that segment of the overall design being partitioned. However, if the simulator uses a design representation different from the design source, then design information is generated in a representation that is usable by the simulator, e.g., in the form of a netlist or the like. Advantageously, in this manner, each simulator is provided with a design representation format that is recognized by that particular simulator.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be embodied in machine-executable instructions, which may be used to cause a general-purpose or special-purpose processor programmed with the instructions to perform the steps or may be performed by hardware components. Alternatively, the steps may be performed by a combination of hardware and software. Importantly, while embodiments of the present invention will be described with reference to design simulation using a simulation backplane, such as the SimMatrix™ electrical simulation backplane, the multi-source partitioning technologies described herein are equally applicable to other types of simulation environments (SimMatrix is a trademark or registered trademark of Mentor Graphics Corporation headquartered in Wilsonville, Oreg.).

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Terminology

Before describing an exemplary simulation environment in which various embodiments of the present invention may be implemented, some terms that will be used throughout this application will briefly be defined.

A "design" is defined as a description of a collection of objects which represent an electrical circuit.

The fundamental design structure for storing elements of a design will be referred to as a "cell", a "module", or a "design block." Cells may contain references to other cells as well as property information associated with the cell. Within a cell, the realization of a specific case of a cell is called a cell instance or simply an instance.

"Co-simulation" is the use of two simulators to verify a design, while "N-way co-simulation" or "multi-simulation" refer to the use of a simulation backplane and two or more simulators to verify a design.

A "simulation backplane" is a set of procedures, protocols, and functions that define the activities and structure of the co-/multi-simulation environment.

A "solver" is an instance of a simulator that is used in a simulation session. Multiple instances of a given simulator may be active at one time during a simulation session.

Partitioning a design involves specifying the design blocks that are to be simulated by the available solvers. The portion of a design that will be simulated by a particular solver is referred to as a "partition." Partitions that have components of multiple levels of hierarchy or are disjoint are still called a single partition. Typically a solver simulates one partition, which may be made up of one or more design blocks. When the entire design is embodied in a single representation format, partitioning is referred to as "single source partitioning." However, when the design is completely represented only by combining two or more subdesigns embodied in two or more representation formats, then the act of partitioning is called "multi-source partitioning."

A "boundary event" is an event that occurs on a "mixed-net," a wire in the design that crosses between two solvers. Depending upon the synchronization algorithm employed, the simulation backplane may synchronize solvers upon the occurrence of boundary events.

The format in which a design or a partition of a design being simulated is represented is referred to as a "design language" or a "design representation." A design representation may be thought of conceptually as any storage mechanism which contains design information and allows extraction of information relevant to the design. In order to simulate a design or portion of a design, the portion of the design being simulated must typically be written in a design representation that is usable by the simulator to which that portion of the design is partitioned. The design representation format in which the overall design being simulated is represented will be referred to herein as the design source representation. Simulator that are capable of extracting the design from the design source representation will be referred to as a "design source simulators," while simulators that cannot use the design source representation will be referred to as "non-design source simulators" or "client simulators." The logical collection of files, databases, memory, and/or other data structures that contain the design source representation will be referred to collectively as the design source.

The one or more data structures and/or files that list and/or describe the components in a design and how they are interconnected, in a design representation upon which a simulator may operate, are collectively referred to as a "netlist."

An Exemplary Simulation Environment

Figure 1:
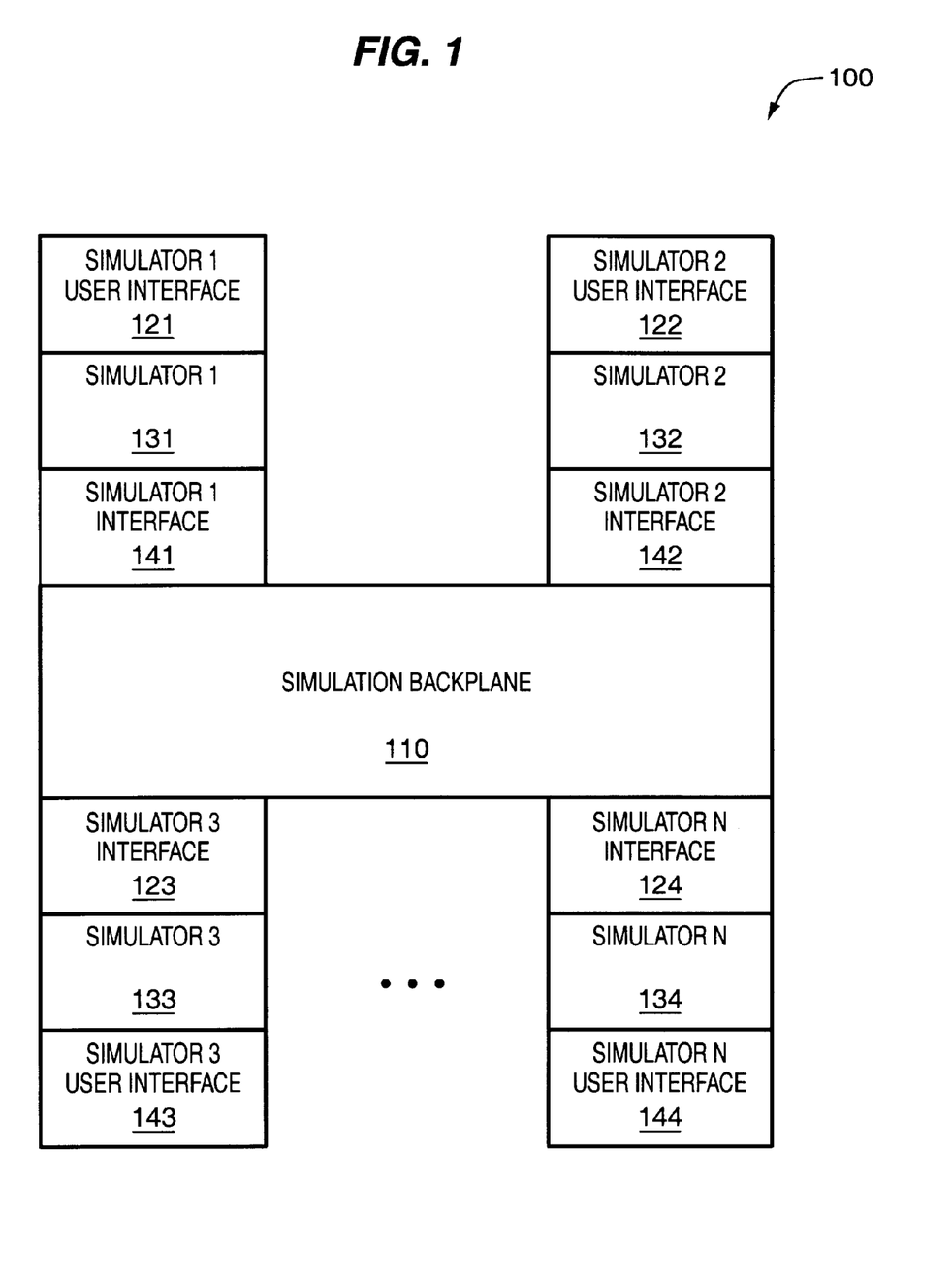
FIG. 1 conceptually illustrates the N-way co-simulation paradigm.

FIG. 1 conceptually illustrates the N-way co-simulation paradigm. A simulation backplane 110, such as the SimMatrix electrical simulation backplane available from Mentor Graphics Corporation, is coupled to a plurality of simulators 131–134 through their respective interfaces 141–144. The simulator interfaces 141–144 each expose a standard set of interface routines for performing functions such as initializing the simulator, performing netlist generation, e.g., writing cell descriptions, parsing netlists partitioned to the simulator, registering boundary events, performing data type conversions, notifying the simulation backplane 110 when boundary events occur, and other functions to facilitate simulation. The simulation backplane 110 defines the simulation environment 100 by way of a set of procedures, protocols and functions and coordinates the interaction among the simulators 131–134. For example, the simulation backplane 110 coordinates event transaction processing, state translation, event arbitration, and manages synchronization processing among the simulators 131–134. Synchronization is the point in the simulation session at which the simulators 131–134 and the simulation backplane 110 agree on the value of time. It is only during synchronization that boundary event information, such as states, currents, or voltages, can be reliably exchanged between simulators. The frequency of synchronizations during a simulation session is directly related to accuracy and performance; the more frequent the synchronizations, the higher the resulting accuracy (to a limit) and the lower the performance (without limit). When a boundary event occurs between simulators, the simulation backplane 110 synchronizes the simulators so that they are at the same point in time and, before transferring any event information, it converts the event information to a representation usable by the target simulator. In this manner, data is reliably exchanged between simulators.

Exemplary synchronization algorithms that may be employed include lockstep synchronization, look-ahead synchronization, optimistic synchronization, signal-based synchronization, and sync-interval synchronization. Lockstep is the oldest, most primitive, most conservative, universally accurate, but the slowest synchronization algorithm. In accordance with the lockstep synchronization algorithm, all simulators are synchronized within a certain fixed interval of time (e.g., every nanosecond). Look-ahead synchronization allows the simulators to execute asynchronously and synchronizes the simulators only when a boundary event occurs. The optimistic synchronization algorithm predicts the time of the next boundary event and simulates to that time. If an incoming boundary event occurs before the predicted time, then the optimistic simulator backtracks to the time of the boundary event. Signal-based synchronization allows synchronization to be triggered on clock or data ready lines, for example. The look-ahead, optimistic, and signal-based synchronization approaches reduce backplane overhead in situations in which communication between two cells is only important when a specific signal (event) occurs by synchronizing on a particular signal and/or a group of signals. Finally, sync-interval synchronization provides a user-programmable fixed time interval synchronization.

Exemplary Computer System

Figure 2:
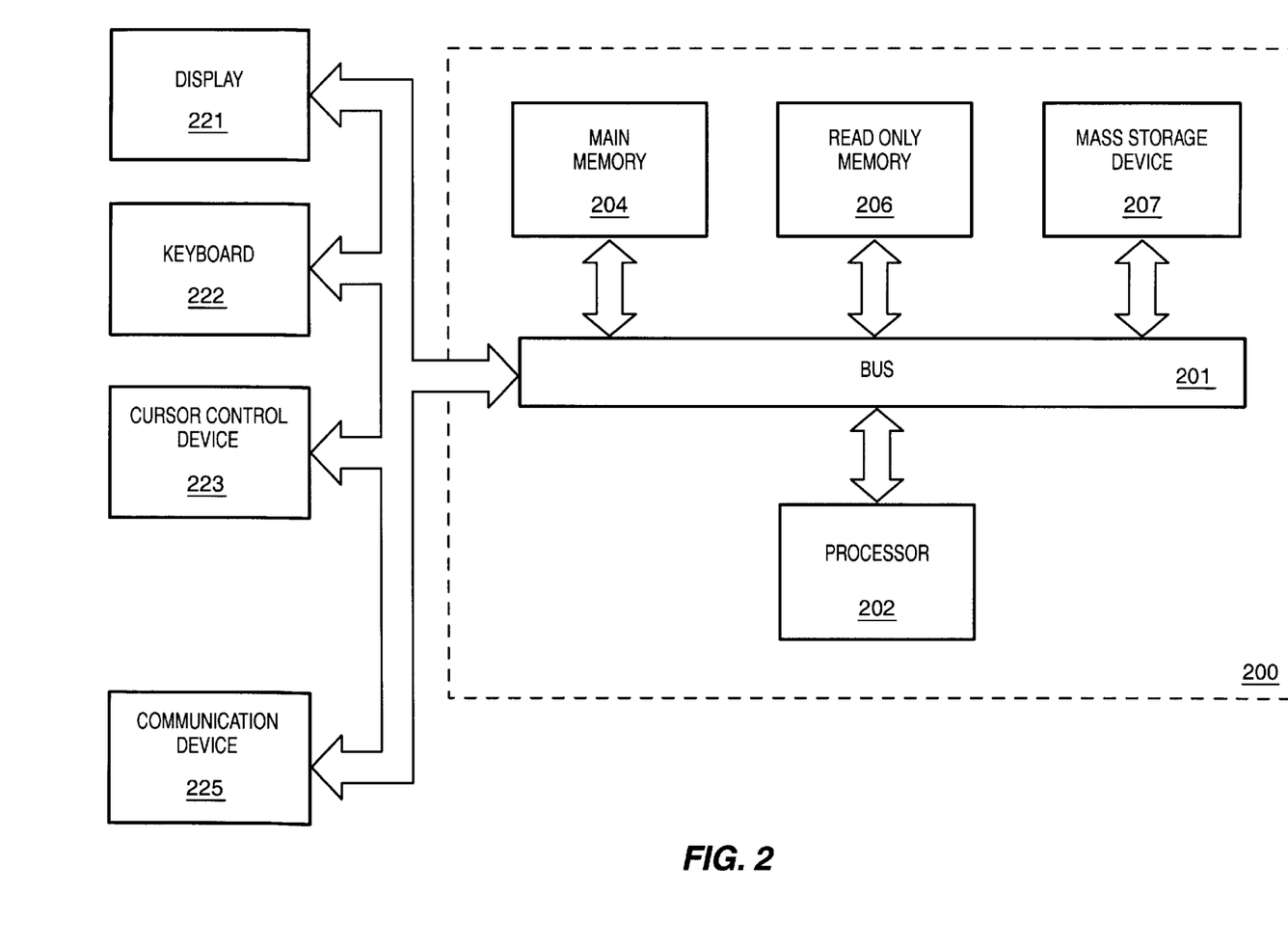
FIG. 2 is a simplified block diagram of a computer system in which various embodiments of the present invention may be implemented.

FIG. 2 is a block diagram illustrating an exemplary computer system 200 upon which one embodiment of the present invention may be implemented. Computer system 200 comprises a bus or other communication means 201 for communicating information, and a processing means such as processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

A data storage device 207 such as a magnetic disk or optical disc and its corresponding drive may also be coupled to computer system 200 for storing information and instructions. Computer system 200 can also be coupled via bus 201 to a display device 221, such as a cathode ray tube (CRT) or Liquid Crystal Display (LCD), for displaying information to a computer user, such as signal names and transitions and values of various signals. Additionally, other graphical information may be presented to the user, such as a depiction of the loading and throughput for each simulator, the number of simulator synchronizations, an indication of the simulation session time, etc. Typically, an alphanumeric input device 222, including alphanumeric and other keys, may be coupled to bus 201 for communicating information and/or command selections to processor 202. Another type of user input device is cursor control 223, such as a mouse, a trackball, or cursor direction keys for communicating direction information and command selections to processor 202 and for controlling cursor movement on display 221.

A communication device 225 is also coupled to bus 201 in order to provide access to other attached computer systems, for example. The communication device 225 may include a modem, a network interface card (NIC), or other well known interface devices, such as those used for coupling to an Ethernet, token ring, or other types of networks. In any event, in this manner, the computer system 200 may be coupled to a number of clients and/or servers via a conventional network infrastructure, such as a company's Intranet and/or the Internet, for example, allowing distributed partition simulation.

Multi-Simulation Overview

Figure 3:
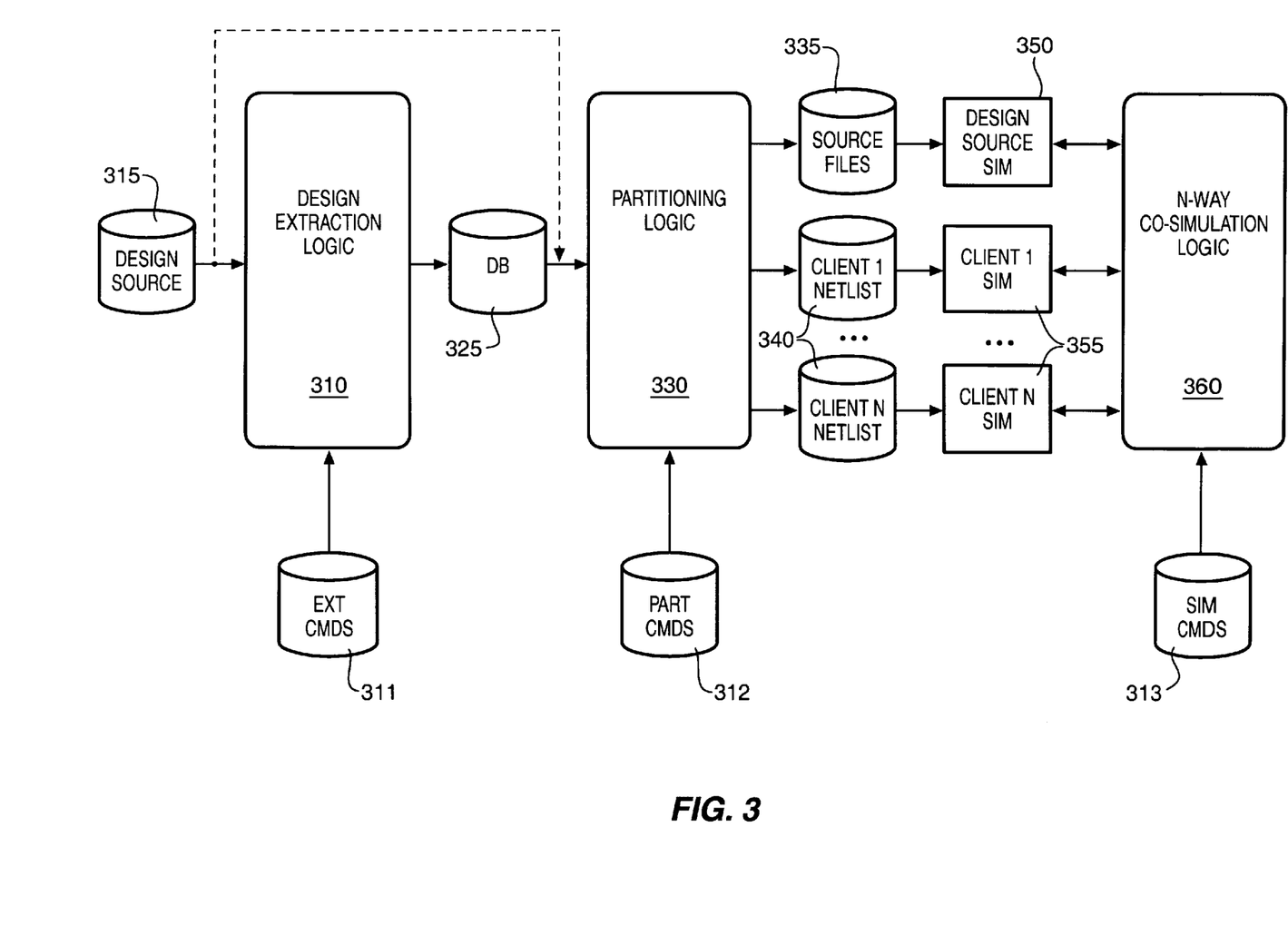
FIG. 3 is an overview of an N-way co-simulation process according to one embodiment of the present invention.

Having described an exemplary computer system upon which one embodiment of the present invention may be implemented, a logical view of exemplary multi-simulation processing blocks and their interaction will now be described with reference to FIG. 3. Briefly, an overall design is initially available in the one or more design representations in which the design was developed, i.e., Verilog, QHDL, VHDL, Quicksim, etc. Importantly, "design representation" in this context is meant to broadly refer to any type of hardware description representation including those representations employed by schematic capture systems and the like. Segments or design blocks (also referred to as cells or modules) of the overall design may be allocated among multiple simulators by a partitioning mechanism. Then, the portion of the design being simulated by a particular simulator is translated from the design source representation into a format recognized by the particular simulator (the target simulator). For example, information, such as a netlist, may be created in a design representation usable by the target simulator that lists and describes all the components in the portion of the design and indicates how they are interconnected. Finally, each of the target simulators use their respective netlists to simulate their portion of the overall design during simulation.

In the embodiment depicted, for purposes of this overview, multi-simulation processing is conceptually divided into three functional units: design extraction logic 310, partitioning logic 330, and N-way co-simulation logic 360. The design extraction logic 310 receives and compiles native design source files 315 and extracts a hierarchical design representation from the design source in accordance with a set of extraction commands 311. According to one embodiment, the extracted hierarchical design representation is written into an internal database 325 which may serve as an input to the partitioning logic 330. Since the design extraction logic 310 operates on a design source, design extraction need only be performed once, unless changes are made to the design source files. For multi-source simulation a design extraction logical block 310 may be employed for each design representation. Additionally, design assembly logic (not shown) may be used to resolve the connections among the two or more subdesigns. In alternative embodiments, the design extraction logic 310 may be bypassed and the design source 315 may be directly input to the partitioning logic 330.

The partitioning logic 330 implements user-supplied partitioning rules (also referred to as partitioning commands or partitioning directives), an exemplary set of which will be described below, to define which segments of the overall design are to be simulated by which simulator(s) 350, 355. The partitioning directives may be supplied by way of a separate file, such as the partitioning commands file 312 or they may be specified as annotations within the design source 315. In any event, for each design segment partitioned to a particular simulator, a netlist or netlist-like information 335, 340 is generated in a format understood by the simulator 350, 355. The simulator 350, 355 may then use its associated netlist and simulation commands, provided by way of a simulation commands file 313, for example, to simulate its portion of the design during simulation. While in the embodiment illustrated, the extraction commands, partitioning directives, and the simulation commands are shown as residing in separate data stores 311, 312, and 313, this information may be combined into a single global design initialization file, placed in separate design block initialization files, or provided fully or in part via annotations in the design source.

Design Representation

Before presenting a more detailed description of the features and advantages of the present invention, an overview of various methods of representing a design structure will now be described. A first type of design representation builds design structure by connecting together subdesigns each of which in turn may be represented by other subdesigns until a level is reached at which only primitive design elements exist (e.g., leaf cells). This first type of design representation is referred to as "hierarchical." In contrast, a non-hierarchical design representation (also referred to as a flat design representation) consists only of primitive instances. A hierarchical design representation may be implicit or explicit. A hierarchical design may be implicitly represented by what is called a "folded" representation. A folded representation uses a list of cells, each of which may include one or more references to other cells to create the hierarchy. An unfolded representation is a hierarchical structure of instances. Recall, a cell (also called a module or a design block), in this context, refers to a fundamental design structure for storing elements of a design, such as registers, receivers, drivers, logic gates, or even ALUs, CPUs, and other components. Cells may contain references to other cells (called "folded instances") as well as properties and other related information. An instance of a cell is the realization of a specific case of a cell.

A more efficient utilization of a system's memory resources may be achieved by operating on a folded representation rather than an unfolded representation since an instance of each type of cell appears only once in the folded representation. As one feature of the present invention, a limitation presented by prior co-simulation solutions, namely the inflexible nature of the level of partitioning provided, is overcome by providing for the automatic creation and/or modification of cells to accommodate the folded representation when instances of a particular cell are partitioned to different solvers. This novel and flexible approach that allows a designer to specify arbitrary partitions will be described further below.

Cell-Based Partitioning

Figure 4A:
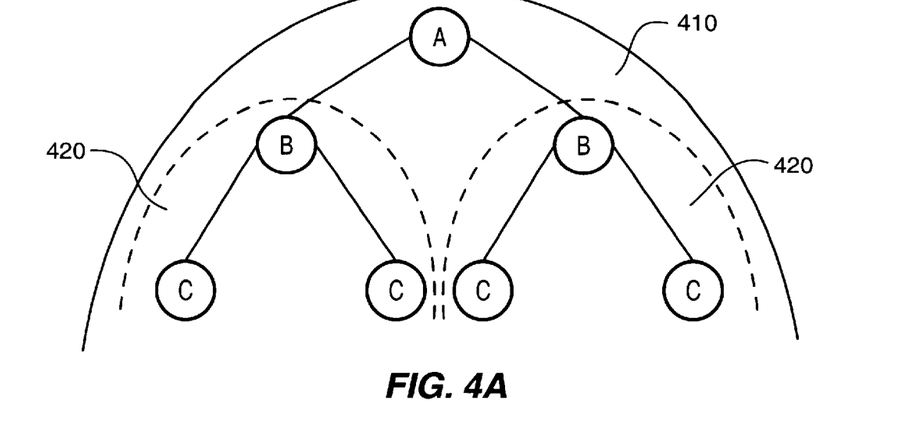
FIG. 4A illustrates exemplary partitions that may be accomplished with cell-based partitioning.

FIG. 4A illustrates exemplary partitions that may be accomplished with cell-based partitioning. Cell-based partitioning permits partitions in which cell descriptions do not need to be modified other than removal of all folded instances within a particular cell. In this example, the overall design comprises three different types of cells: A, B, and C; and the unfolded hierarchical representation comprises seven cell instances. The overall design is segmented into two partitions: a primary partition 410 and a second partition 420. The primary partition 410 is partitioned to a first solver. The second partition 420 is partitioned to a second solver.

Figure 4B:
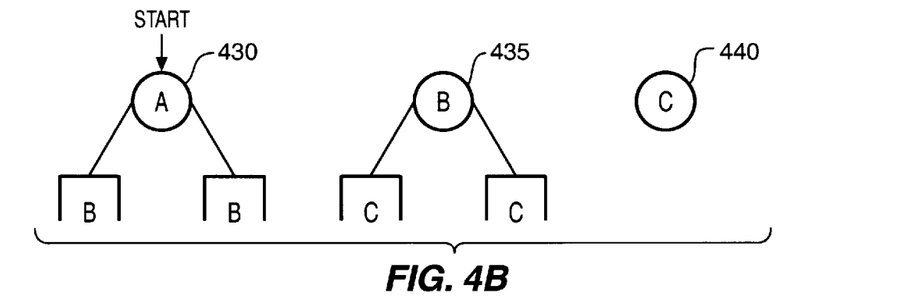
FIG. 4B illustrates a folded representation of the design of FIG. 4A.

FIG. 4B illustrates a folded representation of the overall design of FIG. 4A. The folded representation comprises a definition of cell A 430, a definition of cell B 435, a definition of cell C 440, and a start indication. Cell A 430 includes two instances of cell B 435. Cell B 435 includes two instances of cell C 440. Cell C 440 is a leaf cell. As mentioned above, and as illustrated by this example, a folded representation more efficiently describes the design by employing only one instance of each type of cell and a list of cells which may include one or more references to other cells to create the hierarchy rather than representing the design as a hierarchy of instances. In this example, the unfolded representation of FIG. 4A requires seven cell instances, while the folded representation of FIG. 4B requires only three cell instances.

Figure 4C:
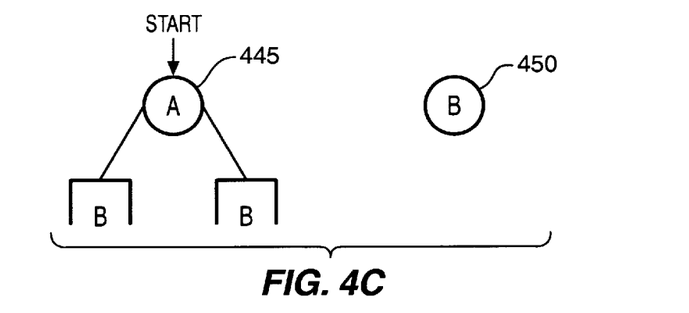
FIG. 4C illustrates a folded representation of the primary partition of FIG. 4A.

FIG. 4C illustrates a folded representation of partition 410. The folded representation of partition 410 includes a definition of cell A 445, a definition of cell B 450, and a start indication. The definition of cell A 445 includes two placeholders for instances cell B 450. However, the definition of cell B 450 no longer includes any reference to cell C 440. That is, cell B 450 is now a leaf node in the partition of the design to be simulated on the primary solver. Importantly, because no remaining cell includes an instance of cell C 440, a definition of cell C 440 may be excluded from the folded representation of partition 410. Preferably, to save memory resources, cell C 440 should be deleted entirely from the resultant netlist or edited design source that is generated for partition 410.

Figure 4D:
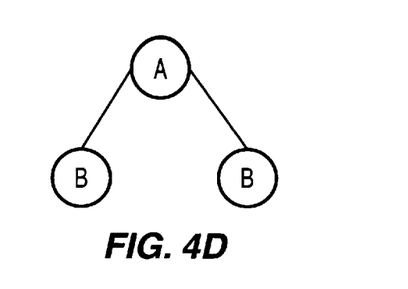
FIG. 4D illustrates an unfolded representation of the primary partition of FIG. 4A.

FIG. 4D illustrates an unfolded representation of partition 410. The unfolded representation may be obtained by fully instantiating the folded representation of FIG. 4C beginning with the cell which is identified by the starting indication.

Instance-Based Partitioning

Figure 5A:
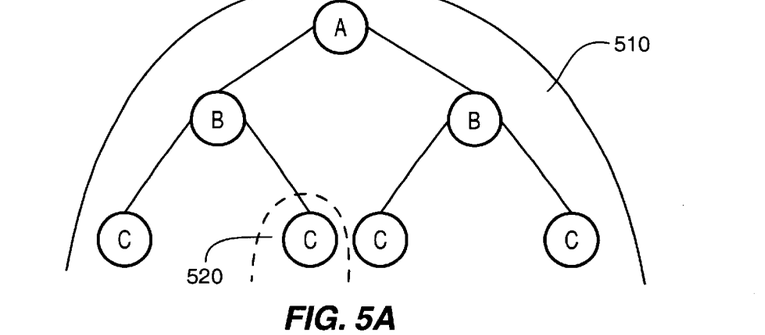
FIG. 5A illustrates exemplary partitions that may be accomplished with instance-based partitioning.

FIG. 5A illustrates exemplary partitions that may be accomplished with instance-based partitioning. Instance-based partitioning permits arbitrary partitions to be created. Therefore, any kind of modifications may be made to a cell. For example, any subset of instances may be removed or replaced. In this example, the overall design again comprises three different types of cells: A, B, and C and there must be two or more instances of B. The overall design is segmented into two partitions, a primary partition 510 and a second partition 520. The primary partition 510 is assigned to a first solver. The second partition 520 is assigned to a second solver. As will be illustrated below, the creation of additional cells and/or the modification of one or more cell definitions is typically required when generating a folded representation for a design in which subsets of instances of a particular cell are partitioned to different solvers.

Figure 5B:
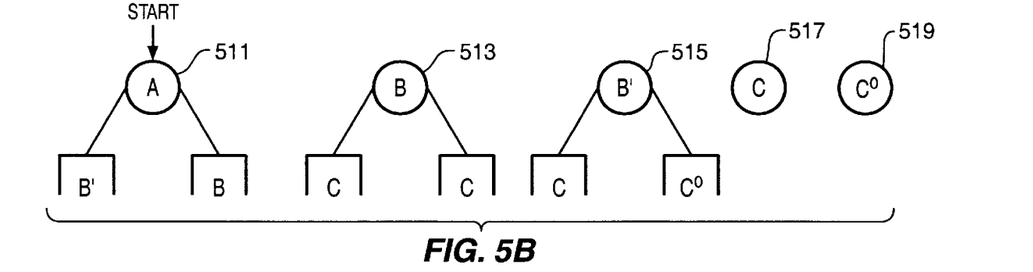
FIG. 5B illustrates a folded representation of the primary partition of FIG. 5A.
Figure 5C:
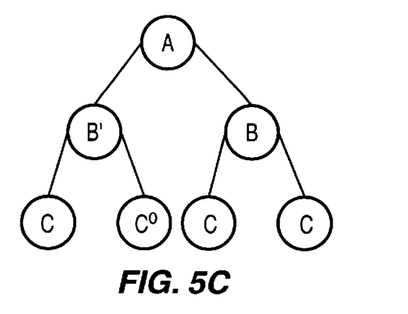
FIG. 5C illustrates an unfolded representation of the primary partition of FIG. 5A according to one embodiment of the present invention

FIG. 5B illustrates a folded representation of partition 510. For purposes of creating the folded representation of partition 510, an empty representation of cell C, cell $C^O$ 519, may be added to the list of cells to replace the instance of cell C that is to be simulated by the second solver. Cell $C^O$ 519 is a cell with no functionality. Importantly, a modification to a design hierarchy at one level will propagate upward through the hierarchy to the top-level cell. Therefore, in this example, the definitions of both cell B and cell A are also effected, thereby necessitating the addition of Cell B' 515 and a modification to cell A. Cell B' 515 represents a modified cell B having an instance of cell $C^O$ 519 and an instance of cell C 517. Cell A 511 may be modified "in place" with an instance of cell B replaced by an instance of cell B' 515 and the other instance of cell B retained. FIG. 5C depicts the unfolded representation of partition 510, obtained by fully instantiating the folded representation of FIG. 5B beginning with cell A 511.

Figure 5D:
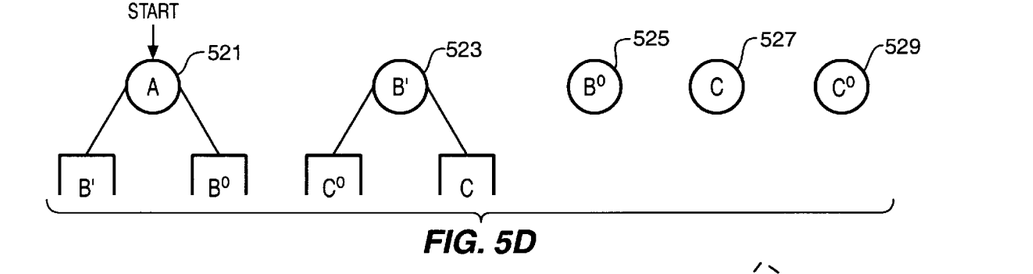
FIG. 5D illustrates a folded representation of the secondary partition of FIG. 5A according to one embodiment of the present invention.

FIG. 5D illustrates a folded representation of partition 520. Recall, in this example, one instance of cell C is to be simulated by the second solver and three instances of cell C are to be simulated by the first solver. Therefore, for purposes of creating a folded representation of partition 520, an empty representation of cell C, cell $C^O$ 529, is added to the list of cells to replace an instance of cell C that is partitioned to the first solver. An empty cell B, Cell $B^O$ 525, may also be added to the list of cells to replace the instance of cell B associated with the other two instances of cell C that are partitioned to the first solver. The folded representation of partition 520 also includes a modified cell A 521 in which an instance of cell B' 523 replaces one instance of cell B and cell $B^O$ 525 may replace the other. The unfolded representation of partition 520 is illustrated by FIG. 5E.

Figure 5E:
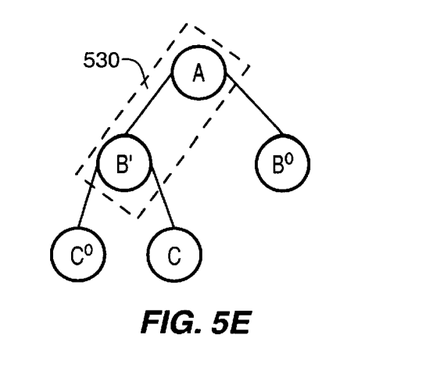
FIG. 5E illustrates an unfolded representation of the secondary partition of FIG. 5A with name space preservation according to one embodiment of the present invention.

FIG. 5E illustrates an unfolded representation of the secondary partition, partition 520, of FIG. 5A with name space preservation according to one embodiment of the present invention. Importantly, in order to preserve the name space mapping across both solvers, the partitioning logic 330 adds the necessary levels of hierarchy from partition 520 to the top cell, A, of the primary partition 510. The levels added for name space are labeled as 530. In this manner, rather that the solvers referring to the same cell with different labels, both solvers will refer to cell C in the following manner: A.B.C, where '.' represents the hierarchy separator.

Multi-Simulation Processing

Figure 6:
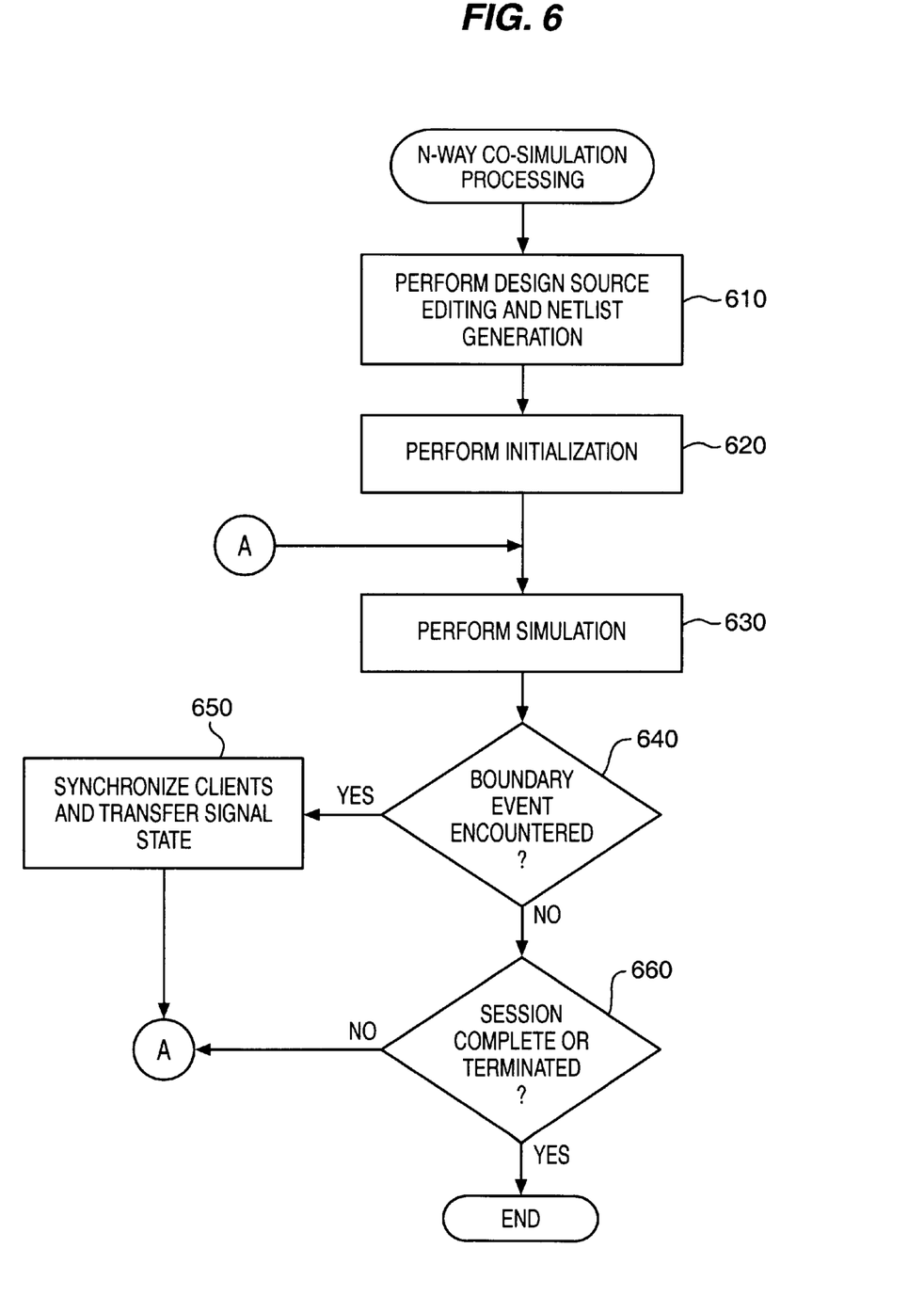
FIG. 6 is a flow diagram illustrating N-way co-simulation processing according to one embodiment of the present invention.

FIG. 6 is a flow diagram illustrating N-way co-simulation processing according to one embodiment of the present invention. The N-way co-simulation process generally breaks down into a partitioning stage, an initialization stage and a runtime stage. The partitioning stage is represented by step 610, the initialization stage is represented by step 620, and the runtime stage includes steps 630 through 660. Briefly, after partitioning and initialization are performed, the runtime stage may start up as a regular simulation session in the environment of the primary simulator, i.e., the simulator to which the top cell of the overall design has been partitioned. Then, when the simulation backplane 110 detects a boundary event corresponding to a design segment partitioned to another simulator, the simulation backplane 110 transfers information relating to the event and control of the simulation session to that simulator. In one embodiment, the steps described below may be performed under the control of a programmed processor, such as processor 202. However, in alternative embodiments, the steps may be fully or partially implemented by any programmable or hard-coded logic, such as Field Programmable Gate Arrays (FPGAs), TTL logic, or Application Specific Integrated Circuits (ASICs), for example.

At step 610, design source editing and netlist generation are performed to create source files 335 and client netlists 340 for use by the design source simulator 350 and client simulators 355, respectively, during simulation.

At step 620, the simulation backplane 110 performs initialization processing. Each simulator is initialized and instructed to open and parse the contents of the one or more netlist files or edited design source files generated as a result of step 610. When parsing is complete, the simulation backplane 110 instructs each of the simulators to register all boundary nets, e.g., mixed nets, probes, and breakpoints, in its design partition. In alternative embodiments, some or all of the probes and breakpoints may be injected during the runtime stage. Initialization processing further includes initializing the state of all nets. For example, the simulation backplane 110 may instruct each simulator to initialize its partition to some initial operating point, thereby resetting each simulator's notion of time to zero, releasing all forced values on probes, and initializing the state of every net. In digital simulators, the initial state of every net is usually defined by the simulator. However, for analog simulators, the initial state of every net results from finding a stable dc operating point for the circuit. Therefore, in the case of an analog circuit, each simulator may be instructed to perform at least one initialization cycle. Subsequently, the states of mixed nets at the end of the initialization may be exchanged between simulators. After any resultant state changes have been made and the dc solution settles, the simulation backplane 110 may begin to coordinate the simulation session. Finally, before starting simulation, the simulation backplane 110 may additionally load simulation-related commands from an initialization file, such as the simulation commands data store 313.

At step 630, the runtime stage begins. Each simulator that is participating in the simulation session, simulates those portions of the overall design that have been partitioned to it until either a boundary event is encountered or until the session is completed or terminated.

When a simulator is simulating and it encounters a boundary net, it drives the net by forcing a new state on that net and passes the value to the simulation backplane 110. At step 640, it is determined whether or not a boundary event has occurred. If a mixed net, a probe or a breakpoint has been encountered, then processing continues with step 650; otherwise processing continues with step 660.

At step 650, the simulation backplane 110 synchronizes the simulators so that they are at the same point in time. This enables data to be reliably exchanged between the simulators. Various synchronization algorithms were described above. In addition to synchronizing the simulators, the simulation backplane 110 also performs data type conversion and transfers boundary event information, such as signal state. Signal state representation, while consistent within any one particular simulator, varies between diverse simulators. Therefore, before transferring the signal state from the source simulator to one or more target simulators, signal mapping (also referred to as data type conversion) is performed between the source and target representations in order to achieve consistent signal state representations. Exemplary conversions include the point-to-point signal mapping or mapping to intermediate simulation backplane types. Point-to-point signal mapping directly maps a data type associated with the source simulator to a data type associated with the target simulator. Mapping to intermediate simulation backplane types involves mapping from a data type associated with the source simulator to an intermediate abstract type associated with the simulation backplane 110 followed by a mapping from the intermediate abstract type to a data type associated with the target simulator. Either conversion mechanism may be implemented with a user-programmable state translation table.

After any necessary data type conversion has been performed the boundary event information may be transferred. The communication channel, the mechanism used to gather and transfer boundary event information, varies from one simulator to another. For example, the transfer may occur through direct memory transfer (e.g., subroutine or shared memory implementation), or through inter-process communication. In any event, after the source and target simulators have been synchronized and the boundary event information has been transferred, simulation processing continues at step 630.

At step 660, a determination is made whether the simulation session has been completed or has been terminated. Completion may be determined by comparison of the design simulation time to some stop time set by the designer while termination is typically the abrupt unscheduled halting of the execution either asynchronously initiated by the designer or asynchronously initiated by the operation system or other master controlling program, for example. If neither condition has occurred then simulation processing continues at step 630; otherwise simulation processing is complete.

Design Source Editing and Netlist Generation

Partitioning a design involves specifying the design blocks of an overall design that are to be simulated by the available solvers. According to various embodiments of the present invention, partitions are allocated among multiple simulators based upon a design source and a set of partitioning directives. For each partition, information in a design representation usable by the target simulator may be generated by a netlister (also referred to as a netlist writer) associated with the target simulator, for example. Importantly, when a design source simulator will be participating in the simulation session, rather than converting the original design source representation into an intermediate format and then writing it back out, the partitioning stage seeks to reuse the original design source so as to prevent loss of information, such as behavior, by procedurally editing the design components. For example, some cells from the design source representation may be modified in place and others may be copied, renamed, and then modified. According to one embodiment, the netlist writers are additionally configured to produce folded representations of hierarchical partitions. Advantageously, in this manner, name space may be preserved across partitions of design source and non-design source simulators, a more natural interaction with solvers is achieved, and various other performance advantages may be attained.

Figure 7:
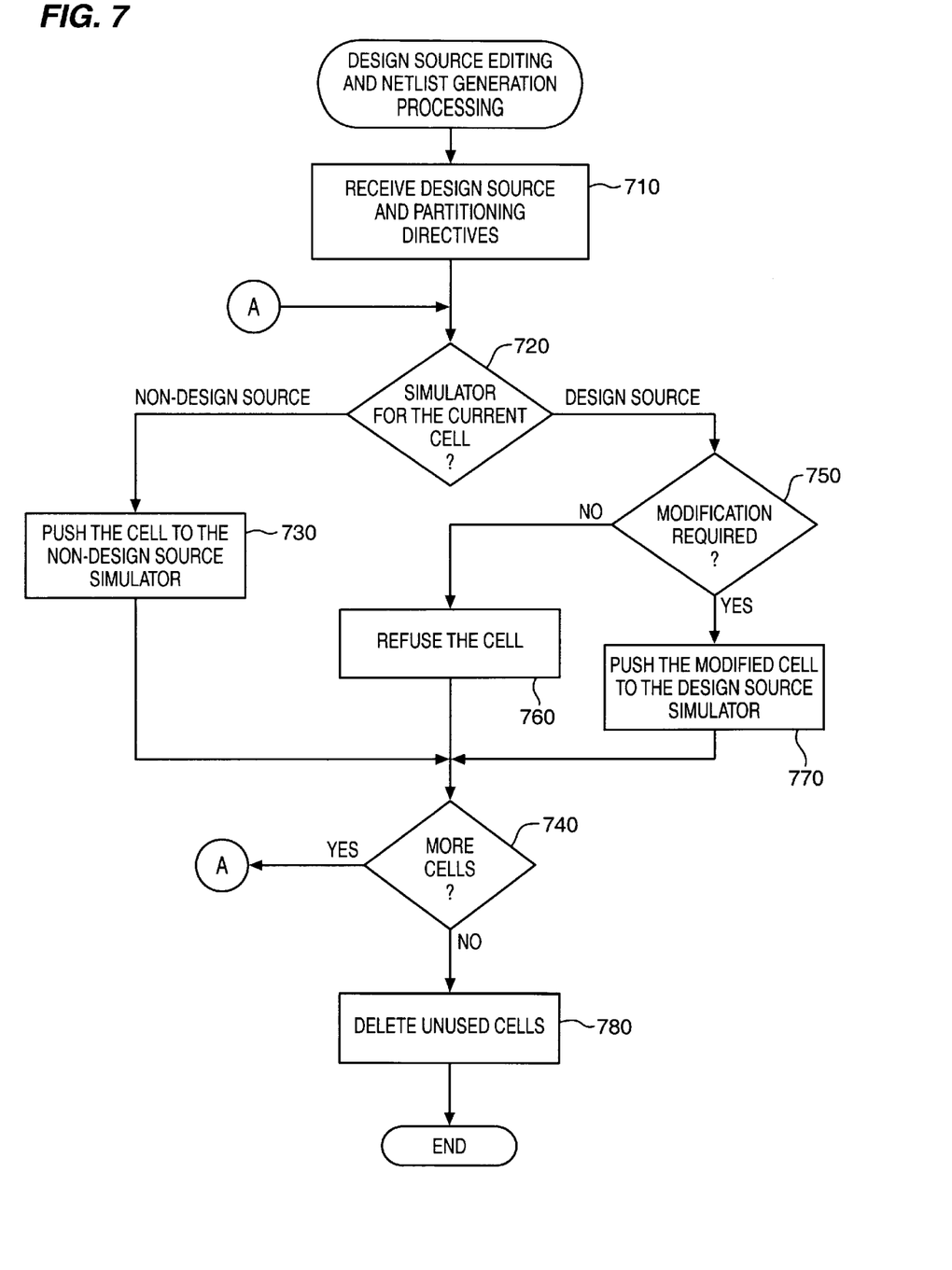
FIG. 7 is a flow diagram illustrating design source editing and netlist generation according to one embodiment of the present invention.

FIG. 7 is a flow diagram illustrating the design source editing and netlist generation processing of step 610 according to one embodiment of the present invention. At step 710, design source and partitioning directives are received by the simulation backplane 110. As mentioned previously, the partitioning directives may be stored in a separate file or provided as annotations in the design source. At step 720, based upon the partitioning directives the simulator for the current cell is determined. If the cell is partitioned to a non-design source simulator, then processing continues with step 730. At step 730, the cell is written to a netlist by a netlist writer corresponding to the non-design source simulator in a define-before-use order. As the netlist writer pushes cells to the non-design source simulator, name space consistency is preserved in two ways. First, name-mapping functions are performed to convert the hierarchical cell name to a valid name for the target simulator. Second, for those simulators that do not own the top cell in the original unpartitioned design, the netlist writer retains name space mapping in the partition by adding as many levels of the original hierarchy as are necessary to preserve the root path. At step 740, it is determined if more cells remain in the design source. If so, the process of design source editing and netlist generation continues at step 720 with the next cell.

Returning to step 720, if it was determined that the current cell is to be partitioned to the design source simulator then processing continues with step 750. At step 750, it is determined if modification of the cell is necessary. The necessity of modification can typically be determined recursively by determining if at least one instance but less than all instances of a child cell are partitioned to another solver or if a child cell requires modification. If the cell requires no modification, then processing continues with step 760 and the cell may be reused. However, if modification of the cell is required, then processing continues with step 770.

At step 770, the cell is modified for use in the target simulator design files, such as source files 335. For example, if all instances of the cell require the same modification, then the cell may be modified in place (i.e., the original description may be modified as it is written to the source files that will be utilized by the design source simulator during simulation). Other cells may be copied from the design source, renamed, and then modified. Advantageously, because the design source editing processing described herein is capable of automatically creating additional cells, the designer is not limited to cell-based partitioning. Rather, the designer may partition instances of a given cell to different solvers, thereby allowing arbitrary partitioning to be achieved. At step 780, if no instances of a particular cell are used in a partition, then memory resources may be conserved by deleting that cell entirely from the resultant netlist.

In this manner, flexible partitioning rules may be used to control the creation of new design files that describe a circuit partition in an external native representation of each simulator. For example, a design may be captured in an HDL, and one part of the design may be partitioned to a hardware accelerator that accepts Language X. The partitioning process will modify the HDL files, "cutting out" the partition for the accelerator, and creating accelerator-native netlists that describe the partition in Language X, which can then be compiled for the accelerator. Exemplary partitioning rules may have the following general form: partition object solver, where     object
        -top specifies the top-level default simulator for the entire design hierarchy until other partition rules occur.
        <instance_name> places the instance specified and all of its contents into the named simulator.
        -cell<cell_name> places all instances of the specified cell and all of its contents into the named simulator.
    solver
        <solver_name> is the name of the simulator.
        @<hostname> is the machine on which the solver runs.
        :<cpu_process> is the process number for the machine specified by <solver_name>@<hostname>.

In order to provide a better understanding of the design source editing and netlist generation processing explained above, exemplary pseudo code and data structure descriptions are provided below.

Cell: Contains a list of hierarchical instances which have modifications to the contained instances (these modifications are based upon either partitioning directives, e.g., delete modification, or through propagation of modifications upward through the hierarchy, e.g., replace modification.

Instmods: Each item in this list contains a list of deleted instances, as well as a list of replaced instances. A deleted instance is an instance that has been partitioned to a different solver than its parent. A replaced instance is an instance whose cell description has been replaced with another cell description for the purpose of representing the deleted instances on a folded basis at a level lower in the design hierarchy than the replaced instance. In addition, each instmods has a field to identify unique sets of the instance modifications—each unique set gets its own value. This field will be set the same for all equivalent sets of instmods. This field is called sigid.

Phase 1-Collect Partitioning Directives
traverse the hierarchical design from the top instance
    for each instance,
        if the instance is not assigned to different solver than parent instance, skip.
        within the parent's cell data structure, add the parent's hierarchical name to a list of hierarchical instances of the parent cell that have partitioned instances where
            each hierarchical instance in the list contains a list of instances that are assigned to different solvers than the parent (called deleted instances).
        add the deleted instance to this secondary list.
        each hierarchical instance in the list also contains a list of instances whose cell description has been changed during phase 2.

Phase 2-(A) Determine Equivalent Sets of Instmods, and (B) Create Cells, Rewrite Design
(A) for each instmods (instmods1)
    if instmods1 sigid is already set, skip.
    otherwise, assign a new unique sigid
for each instmods on remainder of list (instmods2)
    if instmods2 sigid is already set, skip.
    if instmods1 and instmods2 are equivalent (both deleted instance lists and replaced instance lists are the same) set instmods2 sigid to instmods1 sigid
(B) for each equivalence set
    if there exists only one equivalent set and that set applies to all hierarchical instances of a cell or it this is the first equivalent set and "in-place" modifications are allowed, then set new cell to current cell
    otherwise create a new cell with a unique name
    record the new cell as a replaced cell description for the instance in the parent cell's instmods
    replace the instance's cell description with the newly created cell Phase 3-Netlist generation
iterate through list of cells sorted by maximum instantiation depth
    write out cell to each required netlist, filtering out deleted instances and writing the replaced instances with reference to the new cell descriptions, and
    writing the remainder of instances with reference to their original cell descriptions In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An automated method of partitioning a design source comprising:
    receiving a design source expressed in a design representation upon which a first simulator may operate, the design source representing a design of a system or portion thereof;
    identifying design blocks within the design source to be partitioned to each of a plurality of solvers based upon one or more partitioning directives and the design source, a first instance of a cell being assigned to a first solver and a second instance of the cell being assigned to a second solver; and
    generating netlist like information corresponding to those of the design blocks partitioned to a non-design source solver including creating one or more additional cells to accommodate a folded representation of a design block containing the first or second instance of the cell.

2. The method of claim 1, further including generating an edited design source corresponding to those of the design blocks partitioned to a solver that represents an instance of the first simulator.

3. The method of claim 2, wherein said generating an edited design source corresponding to those of the design blocks partitioned to a solver that represents an instance of the first simulator further includes generating a modified cell definition of the cell's parent to accommodate a folded representation of a design block from which the first or second instance of the cell is partitioned.

4. The method of claim 1, wherein the set of partitioning directives is separate from the design source, and wherein the method further includes receiving the set of partitioning directives.

5. The method of claim 1, wherein the set of partitioning directives is included as annotations in the design source, and wherein the method further includes parsing the design source to determine partitioning directives.

6. The method of claim 1, wherein said generating netlist like information corresponding to those of the design blocks partitioned to a non-design source solver further comprises preserving name space in the design blocks partitioned to non-design source solvers.

7. The method of claim 6, wherein said preserving name space in the design blocks partitioned to non-design source solvers further comprises producing hierarchical partitions for each of the non-design source solvers, the hierarchical partitions each including as many levels of hierarchy from the design source as are necessary to preserve a path to the top cell.

8. An automated method of partitioning a design source comprising:
    receiving a design source expressed in a design representation upon simulator may operate, the design source representing a design of a system or portion thereof;
    identifying design blocks within the design source to be partitioned to each of a plurality of solvers based upon one or more partitioning directives and the design source, wherein there exists two or more instances of a cell where one subset of instances containing at least one instance but not all of the cell's instances is assigned to a first solver and a second subset of instances is assigned to a second solver and the contents of another instance of the cell are assigned differently to a solver of the plurality of solvers; and
    generating an edited design source corresponding to those of the design blocks partitioned to a solver that represents an instance of the first simulator including generating a modified cell definition of the cell's parent to accommodate a folded representation of a design block from which the first or second instance of the cell is partitioned.

9. The method of claim 8, further including generating netlist like information corresponding to those of the design blocks partitioned to a non-design source solver including creating one or more additional cells to accommodate a folded representation of a design block containing the first or second instance of the cell.

10. The method of claim 8, wherein the set of partitioning directives is separate from the design source, and wherein the method further includes receiving the set of partitioning directives.

11. The method of claim 8, wherein the set of partitioning directives is included as annotations in the design source, and wherein the method further includes parsing the design source to determine partitioning directives.

12. The method of claim 9, wherein said generating netlist like information corresponding to those of the design blocks partitioned to a non-design source solver further comprises preserving name space in the design blocks partitioned to non-design source solvers.

13. The method of claim 12, wherein said preserving name space in the design blocks partitioned to non-design source solvers further comprises producing hierarchical partitions for each of the non-design source solvers, the hierarchical partitions each including as many levels of hierarchy from the design source as are necessary to preserve a path to the top cell.

14. An automated method of partitioning a design source comprising:
    reading a design source upon which a first simulator may operate, the design source defining a plurality of cells representing a design of a system or a portion thereof;
    identifying two or more instances of a cell where one subset of instances containing at least one instance but not all of the cell's instances is assigned to a first solver and a second subset of instances is assigned to a second solver and the contents of another instance of the cell are assigned differently to a solver based upon a set of partitioning rules; and
    generating edited design source corresponding to a partition to be simulated by the first solver and netlist information in a format understood by the second solver, the edited design source including a modified cell description of a parent cell with which the cell is associated.

15. An automated method of partitioning a design source comprising:
    reading a design source upon which a first simulator may operate, the design source defining a design representation;
    based upon a set of rules:
        identifying a primary partition of the design representation that is to be simulated by a first solver, the primary partition including a top cell of the design representation;
        identifying a secondary partition of the design representation that is to be simulated by a second solver;
        identifying a partition in which there exists two or more instances of a cell where one subset of instances containing at least one instance but not all of the cell's instances is assigned to a first solver and a second subset of instances is assigned to a second solver and the contents of another instance of the cell are assigned differently to a solver; and
    generating netlist information for the second solver while retaining name space mapping in the secondary partition by adding one or more levels of hierarchy so as to include information about the top cell in the secondary partition.

16. A simulation backplane comprising:
    a storage device having stored therein a partitioning routine; and
    a processor coupled to the storage device for executing the partitioning routine to
    (a) read a design source which may be operated upon by a first simulator and (b) generate partitions corresponding to a plurality of solvers, where:
        the design source defines a plurality of cells representing a design of a system or a portion thereof,
        a first instance of a cell to be simulated by a first solver of the plurality of solvers and a second instance of the cell to be simulated by a second solver of the plurality of solvers are identified based upon a set of partitioning rules,
        a partition exists in which there are two or more instances of a cell where one subset of instances containing at least one instance but not all of the cell's instances is assigned to a first solver and a second subset of instances is assigned to a second solver and the contents of another instance of the cell are assigned differently to a solver of the plurality of solvers; and an edited design source is generated for the first solver and netlist information is generated for the second solver, the edited design source including a modified cell description of a parent cell with which the cell is associated.

17. A simulation backplane comprising:

a storage device having stored therein a partitioning routine; and a processor coupled to the storage device for executing the partitioning routine to (a) read a design source which may be operated upon by a first simulator and (b) generate partitions corresponding to a plurality of solvers, where:

the design source represents a design of a system or a portion thereof, a primary partition of the design is identified based upon a set of rules, and the primary partition includes a top cell of the design and is assigned to a first solver, a secondary partition of the design is identified based upon the set of rules, the secondary partition being assigned to a second solver, a partition exists in which there are two or more instances of a cell where one subset of instances containing at least one instance but not all of the cell's instances is assigned to a first solver and a second subset of instances is assigned to a second solver and the contents of another instance of the cell are assigned differently to a solver of the plurality of solvers, and netlist information for the second solver is generated while retaining name space mapping in the secondary partition by adding one or more levels of hierarchy so as to include information about the top cell in the secondary partition.

18. A machine-readable medium having stored thereon data representing sequences of instructions, said sequences of instructions which, when executed by a processor, cause said processor to:

read a design source upon which a first simulator may operate, the design source defining a design representation;

based upon a set of rules:

identify a primary partition of the design representation that is to be simulated by a first solver, the primary partition including a top cell of the design representation;

identify a secondary partition of the design representation that is to be simulated by a second solver;

identify a partition in which there exists two or more instances of a cell where one subset of instances containing at least one instance but not all of the cell's instances is assigned to a first solver and a second subset of instances is assigned to a second solver and the contents of another instance of the cell are assigned differently to a solver; and generate netlist information for the second solver while retaining name space mapping in the secondary partition by adding one or more levels of hierarchy so as to include information about the top cell in the secondary partition.

19. An automated method of partitioning a design source comprising:

receiving a design source expressed in a design representation upon which a first simulator may operate, the design source representing a design of a system or portion thereof;

identifying design blocks within the design source to be partitioned to each of a plurality of solvers based upon one or more partitioning directives and the design source, a first instance of a cell being assigned to a first solver and a second instance of the cell being assigned to a second solver; and generating netlist like information corresponding to those of the design blocks partitioned to a non-design source solver, including:

(1) creating one or more additional cells to accommodate a folded representation of a design block containing the first or second instance of the cell, and (2) preserving name space in the design blocks partitioned to non-design source solvers by producing hierarchical partitions for each of the non-design source solvers, the hierarchical partitions each including as many levels of hierarchy from the design source as are necessary to preserve a path to the top cell.

20. The method of claim 19, further including generating an edited design source corresponding to those of the design blocks partitioned to a solver that represents an instance of the first simulator.

21. The method of claim 20, wherein said generating an edited design source corresponding to those of the design blocks partitioned to a solver that represents an instance of the first simulator further includes generating a modified cell definition of the cell's parent to accommodate a folded representation of a design block from which the first or second instance of the cell is partitioned.

22. The method of claim 19, wherein the set of partitioning directives is separate from the design source, and wherein the method further includes receiving the set of partitioning directives.

23. The method of claim 19, wherein the set of partitioning directives is included as annotations in the design source, and wherein the method further includes parsing the design source to determine partitioning directives.

24. An automated method of partitioning a design source comprising:

receiving a design source expressed in a design representation upon which a first simulator may operate, the design source representing a design of a system or portion thereof;

identifying design blocks within the design source to be partitioned to each of a plurality of solvers based upon one or more partitioning directives and the design source, wherein there exists two or more instances of a cell where one subset of instances containing at least one instance but not all of the cell's instances is assigned to a first solver and a second subset of instances is assigned to a second solver and the contents of another instance of the cell are assigned differently to a solver of the plurality of solvers;

generating an edited design source corresponding to those of the design blocks partitioned to a solver that represents an instance of the first simulator including generating a modified cell definition of the cell's parent to accommodate a folded representation of a design block from which the first or second instance of the cell is partitioned; and generating netlist like information corresponding to those of the design blocks partitioned to a non-design source solver, including:

(1) creating one or more additional cells to accommodate a folded representation of a design block containing the first or second instance of the cell, and (2) preserving name space in the design blocks partitioned to non-design source solvers by producing hierarchical partitions for each of the non-design source solvers, the hierarchical partitions each including as many levels of hierarchy from the design source as are necessary to preserve a path to the top cell.

25. The method of claim 24, wherein the set of partitioning directives is separate from the design source, and wherein the method further includes receiving the set of partitioning directives.

26. The method of claim 24, wherein the set of partitioning directives is included as annotations in the design source, and wherein the method further includes parsing the design source to determine partitioning directives.

27. A machine-readable medium having stored thereon data representing sequences of instructions that, when executed by a processor, cause the processor to perform operations comprising:

receiving a design source expressed in a design representation upon which a first simulator may operate, the design source representing a design of a system or portion thereof;

identifying design blocks within the design source to be partitioned to each of a plurality of solvers based upon one or more partitioning directives and the design source, a first instance of a cell being assigned to a first solver and a second instance of the cell being assigned to a second solver; and generating netlist like information corresponding to those of the design blocks partitioned to a non-design source solver including creating one or more additional cells to accommodate a folded representation of a design block containing the first or second instance of the cell.

28. The medium of claim 27, wherein the instructions further comprise instructions that, when executed by a processor, cause the processor to perform operations comprising generating an edited design source corresponding to those of the design blocks partitioned to a solver that represents an instance of the first simulator.

29. The medium of claim 28, wherein said generating an edited design source corresponding to those of the design blocks partitioned to a solver that represents an instance of the first simulator further includes generating a modified cell definition of the cell's parent to accommodate a folded representation of a design block from which the first or second instance of the cell is partitioned.

30. The medium of claim 27, wherein the set of partitioning directives is separate from the design source, and wherein the method further includes receiving the set of partitioning directives.

31. The medium of claim 27, wherein the set of partitioning directives is included as annotations in the design source, and wherein the method further includes parsing the design source to determine partitioning directives.

32. The medium of claim 27, wherein said generating netlist like information corresponding to those of the design blocks partitioned to a non-design source solver further comprises preserving name space in the design blocks partitioned to non-design source solvers.

33. The medium of claim 32, wherein said preserving name space in the design blocks partitioned to non-design source solvers further comprises producing hierarchical partitions for each of the non-design source solvers, the hierarchical partitions each including as many levels of hierarchy from the design source as are necessary to preserve a path to the top cell.

* * * * *